April 2, 1963 J. H. LEMELSON 3,084,213

FACSIMILE APPARATUS

Filed Feb. 28, 1958 5 Sheets-Sheet 1

INVENTOR.

JEROME H. LEMELSON

April 2, 1963 J. H. LEMELSON 3,084,213

FACSIMILE APPARATUS

Filed Feb. 28, 1958 5 Sheets-Sheet 2

INVENTOR.
JEROME H. LEMELSON

April 2, 1963 J. H. LEMELSON 3,084,213

FACSIMILE APPARATUS

Filed Feb. 28, 1956 5 Sheets-Sheet 3

INVENTOR.
JEROME H. LEMELSON

April 2, 1963

J. H. LEMELSON 3,084,213

FACSIMILE APPARATUS

Filed Feb. 28, 1958

5 Sheets-Sheet 4

INVENTOR.
JEROME H. LEMELSON

April 2, 1963 J. H. LEMELSON 3,084,213

FACSIMILE APPARATUS

Filed Feb. 28, 1958 5 Sheets-Sheet 5

INVENTOR.
JEROME H. LEMELSON

United States Patent Office 3,084,213

Patented Apr. 2, 1963

3,084,213

FACSIMILE APPARATUS

Jerome H. Lemelson, 43A Garfield Park Homes, Metuchen, N.J.

Filed Feb. 28, 1958, Ser. No. 723,075
15 Claims. (Cl. 178—6.6)

This invention relates to apparatus for automatically transmitting and recording picture information. In particular, it relates to automatic facsimile systems which may be adapted for use in an automatic switching system such as an automatic dial telephone system and/or a public telephone dial operated system without modification to said system.

It is known in the art to transmit picture information by wire and to automatically record said information at a remote location on a photosensitive sheet of recording paper secured to a rotating drum by scanning said drum with an optical transducer adapted to receive and convert a picture signal to modulated light. While such equipment is in common use, it suffers a number of shortcomings, primary of which is that the equipment is expensive, bulky, slow to print and requires manual attendance for loading and unloading the photo-sensitive paper from the drum. Furthermore, such apparatus is usually employed by the telegraph companies or organizations having direct wire connections between machines.

Accordingly it is a primary object of this invention to provide new and improved facsimile systems which are relatively low in cost, simple to operate and permit automatic, unattended operation at either or both ends of a transmission circuit across which information is being transmitted.

Another important object is to provide new and improved automatic facsimile systems which may be operated unattended from either or both ends of a signal transmission circuit.

Still another object is to provide an automatic facsimile system employing conventional telephone circuits as a picture signal transmission medium, which system includes automatic means for ascertaining the connection of a selected circuit and the successful completion of the transmission and recording of a particular picture signal over said circuit.

Another object is to provide improved data transmission systems which are relatively foolproof in operation and are flexible in operation in that they are adaptable to any form of automatic selection switching system.

Still another object is to provide improved apparatus for the automatic transmission of picture information and the automatic receipt and recording of said information at one or more of a plurality of receiver stations simultaneously and automatically without the need for human attendance at any of said stations for conditioning said apparatus or for indicating to the transmitter station if the equipment thereat is conditioned for the receipt of said information and if the equipment has recorded said information.

A further object is to provide a new and improved system for the automatic transmission of picture information and the automatic recording of said information as a picture at one or more of a plurality of locations remote from a transmitter utilizing conventional telephone circuitry in a manner such that said receiver and printing stations may be easily added to or taken out of said system wherever telephone lines are connected without the need of elaborate changes in existing receiver equipment.

Still another object is to provide a system including apparatus for the automatic electrical transmission of a plurality of document images without the need for the manual attention of said apparatus, each image being transmitted to one or more selected of a plurality of receiving stations at different locations, with said system including automatic detection means for determining if a selected or a plurality of predetermined connections have been made and also including means for automatically recycling a circuit selection means if any of said connections have not been made.

Another object is to provide apparatus for the automatic transmission of picture information from a sending station to a remotely situated receiving station, and for the automatic recording thereat of said signal as an image, said apparatus including means for automatically transmitting a plurality of said signals to said receiving station and for reproducing each as a different image or picture on different printing mediums, said apparatus also including means for conveying said prints away from said receiving and printing apparatus and for automatically distributing them to predetermined remote locations.

Still another object is to provide a new and improved facsimile system employing the national telephone system for the automatic transmission of picture information to any location which may be connected thereto by dialing.

Another object is to provide an automatic facsimile system which may be controlled by an automatic controller or computing device, said system having means for effecting the automatic transmission of a plurality of different picture signals to any location having a conventional telephone which is connectable by telephone wire to the source of a picture or digital signal.

Still another object is to provide an automatic signal reproduction, transmission and recording system which is operative whereby one or a plurality of signals recorded or transducible automatically from a record medium may be automatically transmitted to one or a plurality of receiving stations and may also be automatically recorded at each by automatic self-operating means without the need for manual attendance of said apparatus whatsoever.

Another object is to provide an automatic information signal reproduction and recording apparatus including a signal generating station and a plurality of receiving stations which are connected to the terminal lines of telephone circuits in an automatic telephone dial system, and including means for utilizing said phone circuits either for the transmission of said information signals or for telephone conversation without the interference of one with the other so that maximum use is attained from said telephone circuitry.

Still another object is to provide an automatically operating system for the automatic transmission of picture or other information signals by wire or short wave means from a sending station to selected of a plurality of receiving stations by means of a plurality of selection signals or codes each of which is identifiable with and energizes a switching means effecting a communication link with a respective of said receiving stations, said system including means at said sending station for indicating when a respective connection has not been made and recording said indication, and means for indicating when a respective information or picture signal has not been recorded in its entirety at a respective receiving station.

For a clearer understanding of the invention reference may be made to the following detailed description and the accompanying drawings, in which.

Figure 3:
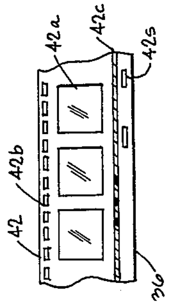
Figure 2:
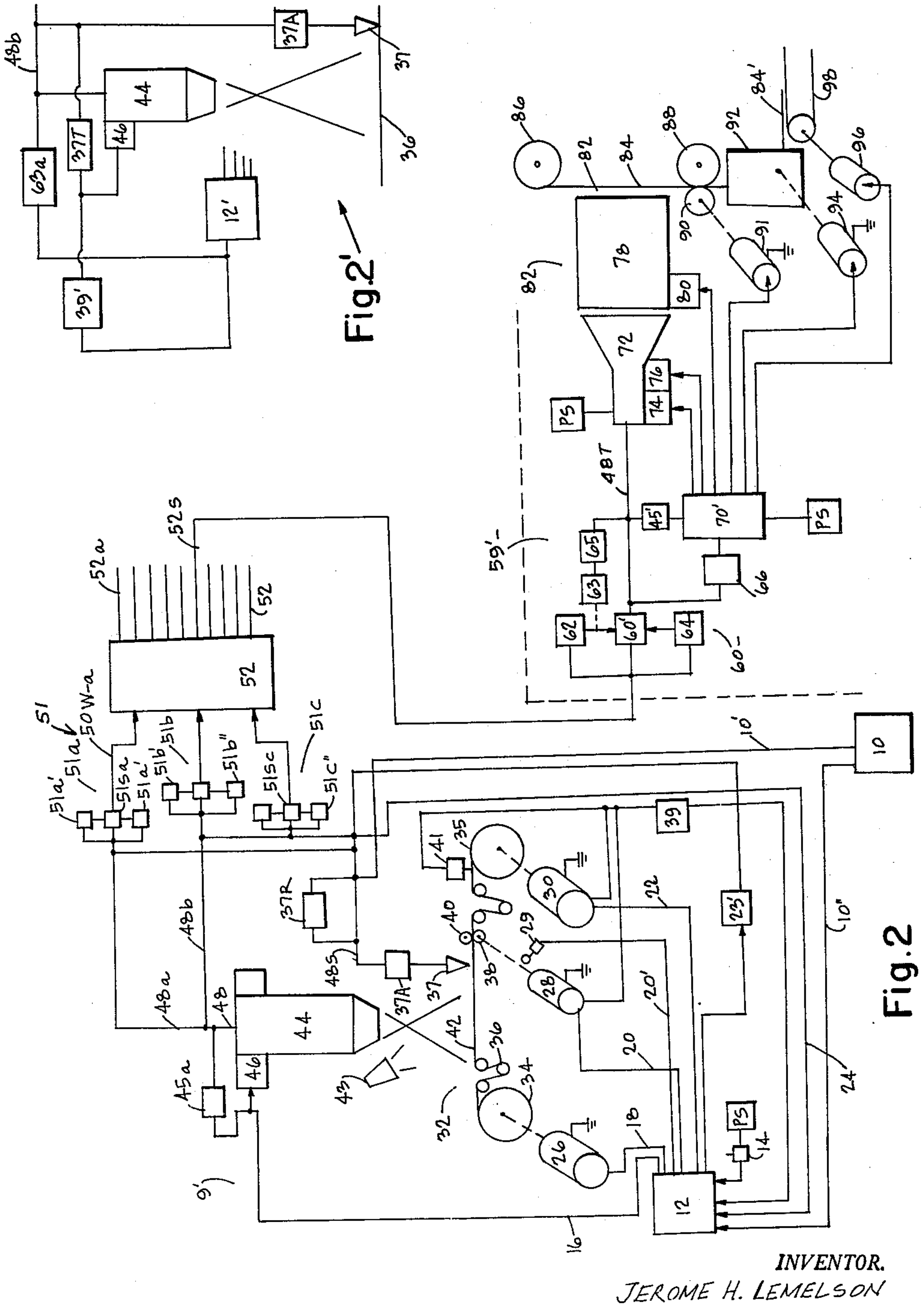
FIG. 2 shows schematically a system similar to that of FIG. 1 save that the selection means is accomplished automatically without manual attendance, and the transmission of a plurality of different image signals to a plurality of selected receivers and associated printing mechanisms is accomplished automatically without human attendance or direction.
Figure 4:
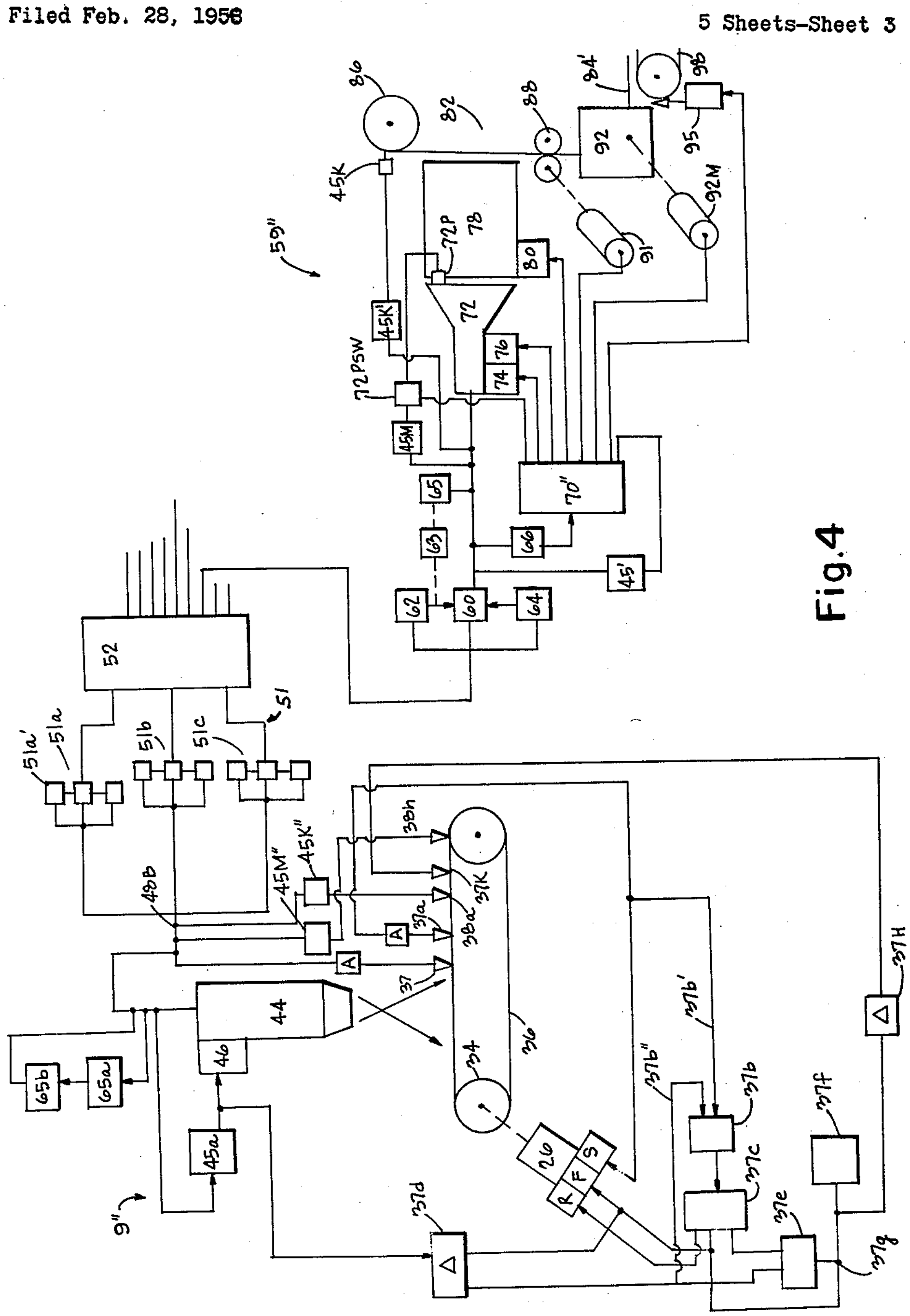

FIG. 2' shows a modification, applicable to the system of FIG. 2, for initiating the transmission of image signals upon completion of the reproduction of connection signals from the recording member;

FIG. 3 shows a fragment of a recording member which may be utilized in the apparatus of FIG. 2 and which contains in addition to a plurality of different picture images, a magnetic recording strip running parallel to said picture strip on which signals may be recorded for controlling said apparatus in the selection of one or more circuits over which the associated picture signal is to be transmitted, and in addition provides a means for recording any errors or omissions in the transmission of a signal;

FIG. 4 shows a system for automatic facsimile transmission over a telephone circuit with means provided for automatically indicating at the transmitter station when one or more of a plurality of connections have not been made between the output of said transmitter station and one or more circuits as predetermined or commanded by the code recorded adjacent a specific image frame.

Figure 5:
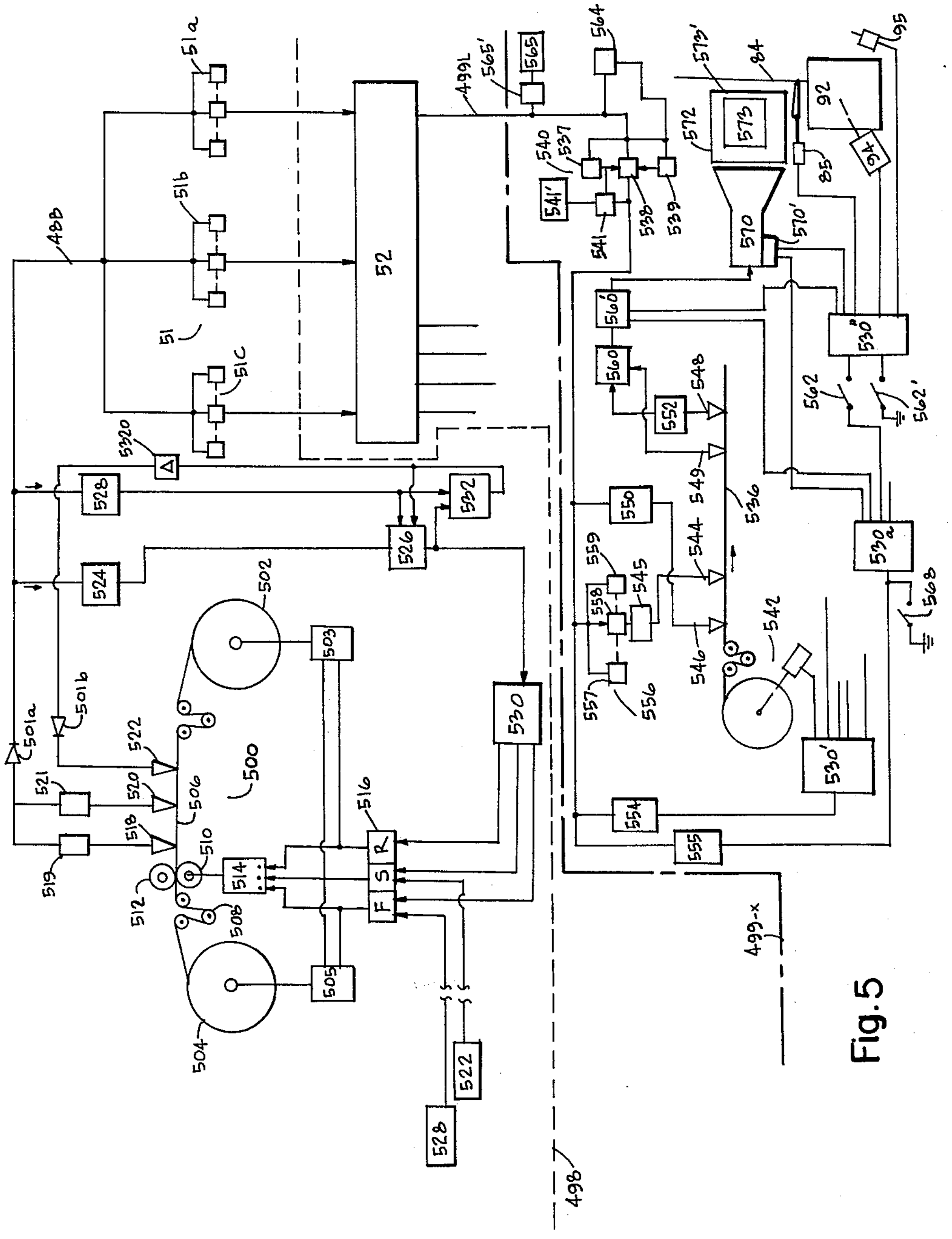

FIG. 5 shows an automatic facsimile system employing magnetic recording means at the signal transmitting and receiving stations.

Figure 6:
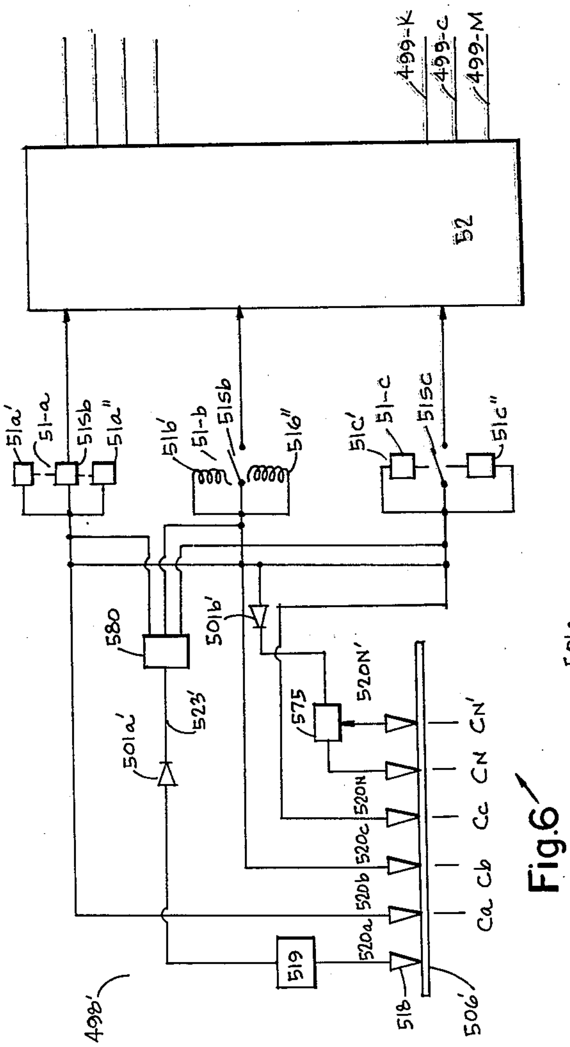
Figure 6:
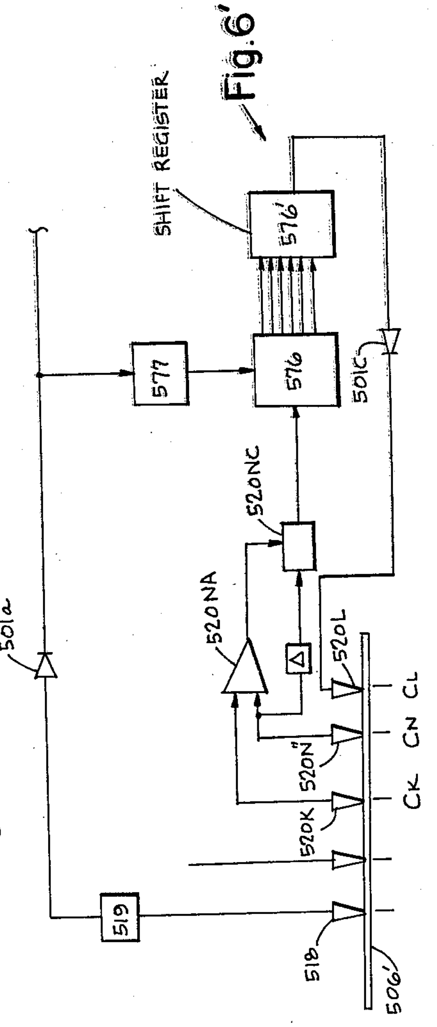

FIG. 6 shows modifications to the system of FIG. 5.

FIG. 6' shows further improvements in the systems of FIGS. 5 and 6.

The systems illustrated in the drawings accompanying this specification are for the most part shown in block diagram notation for the purposes of simplifying the diagrams. Wherever circuit connecting means or lines are shown they generally refer to wire pairs. Wherever control components such as switches, relays, tone generators, timers, sequential switching devices, motors, and the like are shown it is assumed, for the purposes of simplicity, that the proper power supplies are provided which are connected to power said devices on the correct side of said switches and components. Wherever magnetic recording and reproduction heads are provided it is assumed that the necessary recording or reproduction amplifiers are provided in their input or output circuits to provide the desired signal power or amplitude. All transmitters and receivers are assumed to be provided with the necessary sources of electrical power.

Figure 1:
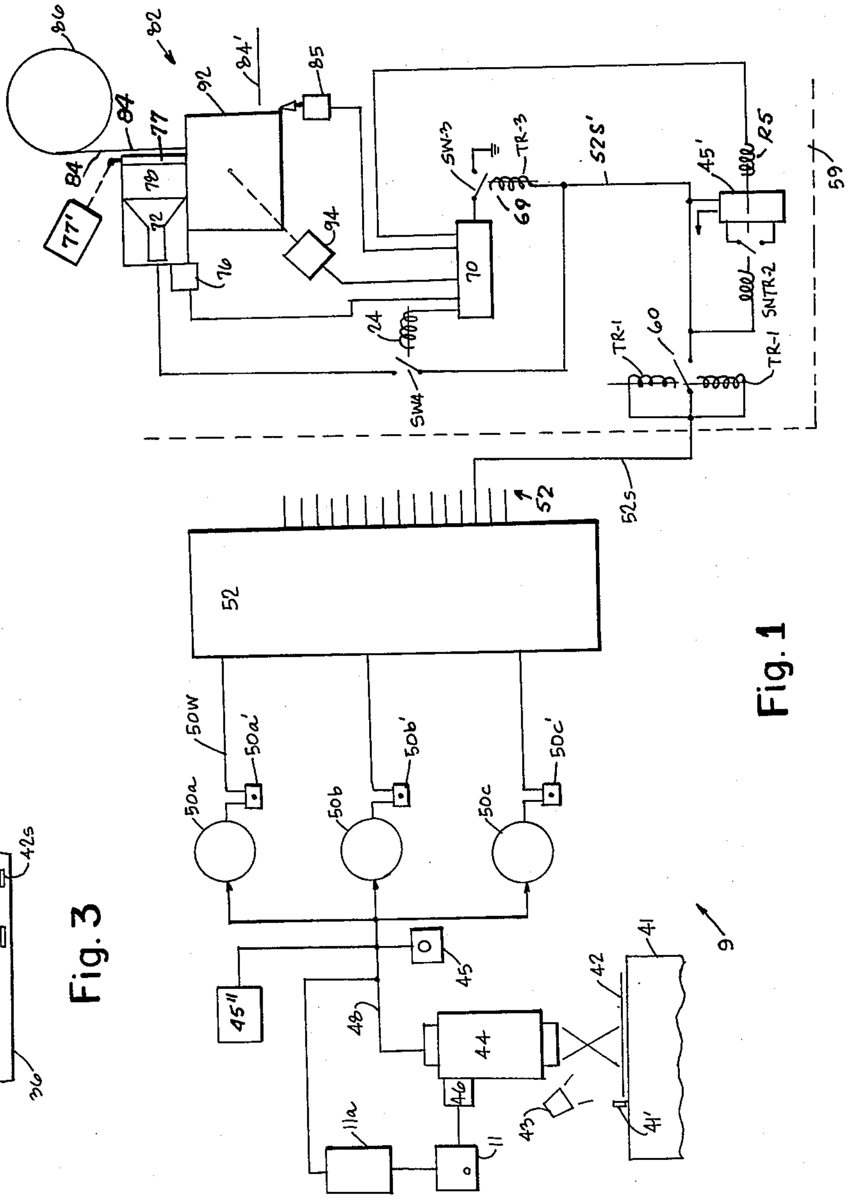
FIG. 1 is a schematic diagram of an automatic facsimile system employing a manual means for connecting the signal output of a video scanning device with one or more facsimile reproduction devices over conventional telephone lines.

FIG. 1 is a schematic diagram which illustrates a facsimile system for the transmission of picture information over conventional telephone lines. The system includes a master or transmitting station 9 from which picture signals originate and are transmitted over one or more wires 50–W of a conventional telephone switching system 52 to one or more receiving stations such as 59 by semi-automatic means, without the need for manual attention of the apparatus at the receiving station for the provision of one or a number of prints of the picture information transmitted. A video camera 44 is provided at the transmitter station 9 having a slow enough scanning system to permit the wire transmission of the video picture signal derived from a single scan or frame sweep over said conventional phone lines 50W. As a result, the operator at 9 may transmit picture information to any business or location having one or more telephone line outlets and having the necessary receiving and hard copy or picture printing equipment.

For the purposes of simplifying the drawings and descriptions certain assumptions are made, namely that the necessary power supplies are assumed to be provided on the correct sides of all switches, control devices and motors shown in the schematic drawings.

The video signal output 47 of the camera 44 is shown connected through multiple switches 50_a'_, 50_b'_, 50_c'_, to telephone switching system 52 which has multiple output circuits 52' extending to various telephone terminal circuits or inputs at different locations in the system, one of which inputs 59 is shown. Each of the switches 50, referred individually by the notations 50_a_, 50_b_, may comprise conventional phone dial line pulsing mechanisms operable for completing a circuit between line 48 extending from the output of 44 and any other phone terminal input in the system. The line 48 is connected via a selected output line such as 50W to the central switching system 52 when a switch such as 50_a'_, for example, is manually closed, and, as a result, a connection may be made to any other telephone line in the system by dialing or otherwise operating a respective of the dial switches 50_a_, 50_b_, 50_c_, etc. which causes pulse trains to be generated and transmitted to the switching system 52 which effects the necessary switching functions by conventional pulse operated switching and selection means. Thus, if the operator of the apparatus at the transmitting station 9 should decide to send a specific picture to be permanently recorded to one or a number of the receiving stations simultaneously, he merely has to make separate connections between 48 and each of said stations by manually dialing two or more of the switches 50_a_, 50_b_, 50_c_, etc. and closing the 50' switches.

To operate the apparatus of FIG. 1, a document such as a letter, drawing or other sheet of illustration 42 is placed in a predetermined position relative the camera 44 on a board or table 41, which predetermined position is determined relative the camera 44 by means of stops or guides 41' projecting from 41. The notation 43 refers to a light for illuminating the surface of 42.

One or more of the switches 50 are dialed, one at a time, to complete circuits between the picture signal output line 48 and one or more of the receiver-printing stations 59. The telephone ring signal over each input 52_s_ energizes a ring responsive relay TR–1 which closes two switches, one 60 a bi-stable switch which completes a circuit between the input line 52S and the internal or terminal circuit 52_s'_ of the receiving and recording station 59, and the other, SWTR–2 an override switch adapted to open a predetermined period after being closed which switch energizes a tone or pulse train coded signal generator 45'. The resulting tone or coded signal output of 45' is transmitted through switch 60 over the completed telephone circuit 52 to the apparatus at station 9 and energizes a relay 45 responsive thereto which causes a light to flash on or a bell to ring indicating to the operator that the circuit has been completed. Should switch 60 be opened at any time after the circuit has been completed, by accident, means are provided for indicating said condition. The output of signal generator 45' is connected to the input side of 60 as illustrated. The moving arm of switch TR–2 is linked to the moving arm of 60 so that if said arm of 60 swings to the open position, the arm of SWTR–2 will swing back completing an energizing circuit to 45' and energizing said signal generator again. The resulting signal will be transmitted back through system 52 to energize 45. If this occurs before 44 has finished its scanning, the facsimile procedure will have to be repeated or stopped. Provided in series circuit with SWTR–2 is a slow-to-open relay operated switch TR–2 which maintains 45' generating a signal for a long enough time after SWTR–2 has temporarily closed to energize the indicator 45 at 9.

The video camera or flying spot scanner 44 is provided with control means for the deflection circuits thereof for causing the scanning beam of 44 to automatically effect a complete screen sweep once it is energized or to make a predetermined number of said screen sweeps which would be determined by the number required to effect the desired recording function at the receiving station. In FIG. 1 for example, a storage tube 72 is utilized to write the picture information on a face thereof and, depending on the characteristics of said storage tube, a signal derived from one or any specified number of screen sweeps of the field 42 by the scanning means of 44 may be required to effect a clear image on the face of said tube.

For slow scanning, one sweep will suffice for most purposes. The notation 46 refers to the trigger or switching input between a power supply the deflection control circuits of camera 44 for causing said camera scanning beams to travel a predetermined scanning path. 46 may be a switch manually actuated per se or actuated by means of a switch 11 which also actuates a tone generator 11*a*. The tone transmitted from 11*a* is sent over all completed circuits to the respective receiver control means 69 at each of said printing stations which in FIG. 1 comprises a tone operated relay TR–3 which closes a switch SW–3 energizing a multi-circuit cycle timer 70 at each station. The timer 70 is adapted to sequentially effect the following actions and to automatically reset thereafter: (*a*) the erase input 76 to the storage picture tube 72 is energized by a signal passed from 70 for a predetermined time interval to erase all picture information or noise from the tube face, (*b*) a relay R4 is energized closing normally open switch SW–4 for a period of time necessary to permit the picture signal transmitted from 44 to pass through a recording amplifier RA to the tube 72 and to be written as an image of said original picture on its face. The notation 78 refers to an optical system for projecting the image on the face of 72 onto a photosensitive strip of paper or film 84 feeding from a roll 86 which may also ride on the face of 72. The timer 70 thereafter starts a motor 94 after a shutter solenoid 77′ has been energized by 70 to effect closure of shutter 77 which was opened by the action of 70 after the writing of the picture on the face of 72, thereby blocking light from 72 to 84. Said motor drives the exposed paper through an automatic developing machine 92. When the paper emerges from 92, a cutter or shear 85 is energized by the action of 70 resulting in cutting off a section of 84 to provide a print of a predetermined length. Upon the recycling of 70, SW4 opens, and the tone generator 45′ may be energized by means of a relay R–5 momentarily closing its input of actuating switch. Thus the indicator means 45 may be used to indicate that the printing apparatus at 59 has operated and completed its cycle and is conditioned whereby either another picture may be transmitted to 59 or the circuit disconnected. The tone responsive indicator means 45 may contain a counter to indicate that all connected station printers have operated or separate indicators at 45 may be used for each circuit, each responsive to a different tone or code. The tone relays of FIG. 1 may be replaced by coded relays whereupon the tone generators would be replaced by code generators. To disconnect the circuit between the camera output and all of the completed inputs, one or more tone or code generators designated by the general notation 45″ may be provided connected to the terminal circuit of station 9 which, when actuated, are operative to disconnect only certain stations while adding others for further transmission. In such an arrangement multiple tone or code generators in 45″ generate respective signals to which each circuit-breaking relay TR1′ is responsive.

In FIG. 2 apparatus is provided for automatically tranmitting one or more of a plurality of picture signals through an automatic switching and connection system 52 which may be a conventional telephone switching and selection system, from an originating circuit 48 in a sending station 9′ to one or more of a plurality of terminal circuits such as 48T which is illustrated as the input of a receiving and recording station 59′ which may be one of a plurality of such stations in the automatic system 52. Circuit selection and connection occurs automatically at 9′ by generating a plurality of signals, referred to hereafter as groups of selection and control or connection signals, which simulate, by means of tone or code signal responsive relays at stations 9′ and 59′ and the relays of system 52, the switching action resulting from dialing to obtain a circuit selection and connection. Each of said signal groups is related to a specific document or image field to be transmitted through the system 52, portions of which are reproduced prior to and after the generation of a picture of information signal associated therewith for effecting the transmission of said signal to selected receiving stations in the system and also effecting the recording of said signal either magnetically or in visual form thereat. A belt, film, or tape 36 is provided on which the images, documents or pictures are placed, mounted, or recorded. Member 36 also contains recordings of said selection and connection code groups in the form of visual markings, holes or magnetically recorded signals. A transducer 37 such as a magnetic reproduction head or hole actuated switch (if the code is a series of punched holes in 36) rides on said tape and provides a series of output signals as the latter is moved relative thereto during positioning the next image or page in the scanning field of a video camera 44. Notation 48S refers to the output of the amplifier 37A of pick-up 37 which amplifier is connectable to the inputs of a plurality of switching units 51 the function of which will be described, which connect the signal output 48*b* of camera 44 with respective lines 50W extending to the automatic switching system 52 in response to signals generated by 37. In the descriptions to follow, discrimination is made between the short digital selection signals for effecting the circuit connections and signals used for control and checking. The latter signals are either specific tones, long pulse signals of predetermined length or codes to which respective relays in the system are responsive. Wherever a tone relay or generator is specified, a corresponding coded relay or binary code signal generator may be employed.

Simulation of the circuit selection and connection function of the conventional phone dial switch which usually is effected by means of multiple stages of selection and connection relays, may be effected by signals transduced from 36 as follows: All selection and connection signals are recorded on one channel of 36 and are reproduced in sequence for actuating the relay storage means of the automatic switching system 52. Signals simulating those generated by a conventional dial switch are recorded as codes or tones on 36 to which signals a relay 37R is responsive which generates pulse signals on the line connection to automatic switching and connection system 52 to effect a predetermined circuit connection.

The film or tape 36 is moved by means of a tape transport 32 of conventional design from a supply reel 34 to a take-up reel 35. A capstan-wheel 38 driven by motor 28 engages the tape 36 against depressor wheel 40 and motors 26 and 30 respectively drive 34 and 35. Control of the starting and stopping of 36 to effect positioning the individual image frames of 36 in the scanning field of 44 and the reproduction of the associated selecting and connecting codes as said tape moves is effected by the action of a multi-circuit self resetting timer 12 used per se to start and stop said drive motors each time it is actuated or activated by a switch 41 having an arm riding on the belt or tape 36 which becomes actuated whenever said arm rides into a cutout in said tape which cutout is positioned such that the next image frame is in the scanning field of 44 when 41 becomes actuated. The motors 28 and 30 are controlled by bi-stable switches which are both actuated to stop said motors when the arm of 41 rides in said position or frame indicating cutout in 36.

The timer 12 is initially actuated by closure of a switch 14 whereafter said timer automatically resets and is operative to recycle in response to a signal from one of several sources. The notation 10 refers to a computer or timer which may energize 12 at any predetermined time or in response to the operation of means for moving the image material on 36 aligned with the camera 44. The notation 10 may also refer to a tone operative relay which is energized upon receipt of a signal on the connected circuit from a tone generator 45′ which is energized at the connected station 59′– upon completion of said circuit in a manner to be described. The line output switches 51– each comprise bi-stable switch contacts 51S– which are closed by the action of a respective tone or code responsive relay 51–' and opened by a second tone or code responsive relay 51–" each being responsive to a respective signal reproduced from 36 or by a signal from computer 10.

During a cycle of operation, operation of programmer 12 effects the starting of motors 28 and 30 which drive 36 at constant speed. The first signal reproduced from 36 by 37 is a tone to which one of the relays 51–' is responsive which effects the closing of respective switches 51S. The next reproduced signals are pulses and/or tones adapted to simulate the signals generated by a conventional rotary dial switch which signals pass to switching system 52 over the connected circuit 50W– and connect the output 48 of camera 44 with a selected terminal circuit when the input switch 60– to the respective station 59' is closed. The switch 60 has a closing relay 62 responsive to the ring signal generated on the input line 52S– for disconnecting said circuit at the end of transmission of an information signal when the respective switch 51 opens. If multiple circuits are selected for connection to the output of 44, the codes or tones are positioned sufficiently apart on tape 36 to permit each connection to be made and lock in before the next selection code group is reproduced. A switch 41 may be actuated at the end of the reproduction of each selection code or when ecah image is in the scanning field of 44 to energize the stop controls of motors 28 and 30 and a time delay relay 39 which is operative to reactivate 12 after scanning has been effected and the picture signals transmitted over the connected circuits. The next signals reproduced from 36 by 37 may be tone signals to which selected or all of the relays 51–" are responsive for disconnecting the circuits 50W– therewith.

Energizing of the beam deflected control 46 may be effected by means of a signal from the multi-circuit controller 12 at a time after 36 has been stopped and all circuit connections have been made. Shown also in FIG. 2 is a feedback signal means for triggering the defection chains of 44 by providing a signal at the switching or trigger control input 46 generated at the terminal circuit 48T. After switch 60– has been closed effecting a circuit connection between 59' and 9' and after all selected circuits have been completed a tone is generated by being reproduced from 36 by 37 and transmitted over all connections. A tone operative relay 66 responsive to said tone in each terminal circuit 48T– becomes energized and actuates a multi-circuit controller or timer 70' of the self resetting type which timer first energizes a tone generator 45' which transmits a tone back to the sending station 9' over the connected line which energizes a relay 45*a* responsive thereto. If a single transmission circuit is completed 45*a* may then energize 46 which controls and effects at least a single screen sweep of the beam of 44 whereupon the picture signal together with the necessary sync or composite video signal is transmitted over said circuit and recorded at the connected station as follows. Timer controller 70' conditions a video storage slow scan tube 72 for writing by actuating the automatic erasure input 74 thereto, whereafter 45*a* is energized. The resulting signal is recorded on the face of 72 and may be reproduced shortly thereafter by the means described for FIG. 1. The severed print 84' drops onto a conveyor belt 98 which is driven by a motor started by 70'. The device 98 may also comprise an automatic stacking or collating mechanism and the motor 96 driving said device may be controlled by a stepping motor or tone operated relay responding to signals transmitted from 9' and reproduced from the tape 36 by 37. The shutter 80 is solenoid controlled and is actuated at the proper time for exposing the paper 84 for a predetermined time by the action of 70'. Similarly, motors 91 and 94 drive said reproduction paper 84 in response to the operation of 70'. The motor 91 drives a capstan wheel 90 engaging the paper from supply roll 86 against a depressor wheel or drum 88 and the paper 84 is fed into an automatic developing and cutting device 92 such as the Lithoflo Processor produced by the Haloid Company of Rochester, New York. The shear cutting means of FIG. 1 may also be employed to cut the print automatically in response to the action of the timer 70'. The Haloid Copyflo 24 may also be employed for apparatus 92 or the RCA Bizmac Electrofax unit with the face of the image tube optical system 78 adjusted for providing the desired image at the proper plane of either of these devices.

The means provided in FIG. 2 for controlling the scanning action of the camera 44 comprises a signal from either timer 12 at the proper time in the cycle or a feedback signal generated after the connection is made. This limits the operation of the apparatus to a single or a predetermined number of connections since the signal provided on line 16 by 12 will occur at the same time after 12 becomes actuated unless 12 is readjusted. The time at which 45' becomes operative to generate a signal which energizes tone relay 45*a* is also fixed. So as not to retain the cycle such a predetermined time of sufficient duration for the maximum number of connections to be made, means are provided in FIG. 2' for initiating the scanning action and generation of the desired picture signal as soon as all circuit selection and connection signals have been reproduced from 36. Recorded on 36 at the end of all selection signals associated with a particular image or picture to be scanned is a particular tone signal or code adapted for reproduction by the transducer head 37. This tone or code is passed to a relay 37T which responsive only thereto and which, upon becoming energized by said signal energizes the input 46 to the scanning controller for the read beam of the scanning tube of the camera 44. Thus 46 is only energized in response to a signal provided on 36. In order to assure that the reproduced signals pertaining to one circuit will not interfere with the switching action of the prior reproduced code, means are provided in FIG. 2' for intermittently driving the tape 36 so that it moves only during the reproduction of a single code group therefrom for effecting a single circuit connection with a predetermined of the circuits 50W–. It is assumed that the components of FIG. 2' are applicable to the circuitry of FIG. 2 with the following modifications. The circuit 16, relay 45*a*, and 45' and 23' are not present. A tone generator 65, shown in FIG. 2 is provided in the terminal circuits 48T of each receiving station 59'– which is adapted to automatically become energized for a short time as soon as the relay 62 closes contacts 60'. If the ring or tone operated relay 62 includes a solenoid for closing said contacts, 60' may also be used to actuate a normally open (slow to open after closing) switch 63 of the over-ride actuator type which gates a power supply or otherwise energizes a tone or code generator 65 which transmits a signal over the common line connection back to the sending station 9'. The signal from generator 65 energizes a relay 63*a* at 9' which is responsive only thereto which relay energizes a different sequential controller 12' than 12 of FIG. 2 which replaces the latter. The tape 36 is driven forward thereafter since the drive motors of the transport 32 are now controlled by 12' and are stopped thereby after a predetermined degree of movement after the entire part of the selection code for the next circuit connection has been reproduced by 37. The feedback signal from generator 65 of the next connected circuit again energizes the reset multi-circuit timer 12' and the cycle is repeated until all connections have been made. The final actuation of 41 occurs when the document, page or image to be scanned by 44 is in the scanning field of said camera so that it will be stopped therein. Just before the detector switch 41 becomes actuated, a tone or code is reproduced by 37 from tape 36 to which a relay 37T in the output of 37 is responsive. The energizing of 37T by said final signal provides a signal for triggering the deflection chain control 46 of 44 and scanning of the picture centered in the scanning field occurs. The signal output of 37T is also used to energize a time delay relay 39′ which provides an actuating signal for recycling 12′. If all new circuits are to be connected, a single code or tone signal may be reproduced during the next movement of 36 to disconnect selected of the circuits 50W– by actuating selected of the relays 51–″. The relay 37T is preferably slow acting so that its output which energizes 46 is provided only after the belt 36 has come to rest.

FIG. 3 is a fragmentary view of one design of the belt or tape 36. The individual picture frames 42*a* may be developed in the base sheet or belt 42 if the latter is photographic film or photosensitive paper and are shown spaced equidistant apart although their spacings may be a function of the selection and connection coding provided on 36. The frames 42*a* may also be individual pictures, typed or written sheets, letters or the like merely placed on the horizontal belt 36 or held thereon by cement or friction fastening means such as clips secured to the belt. Adjacent the image frame containing center portion of 36 is a band 42C of magnetic recording material such as magnetic oxide bonded to the belt base 42. Cutouts 42S are provided adjacent 42S for actuation of switch 41 although the same function may be provided by a signal recorded on an adjacent track of 42C. The signals recorded on 42C and the frames or sheets 42*a* bear a positional relationship to each other and the cutouts 42S utilized for synchronization purposes and the selection of the required circuits for related frames.

FIG. 4 shows a facsimile system adapted for transmitting picture information as picture signals reproducible as different still images or pictures at one or a plurality of receiving and printing stations and effecting switching connection and transmission automatically without the attention of an operator. An automatic switching system 52 such as an automatic telephone, digitally operated circuit selection and connection system is employed. The receiving and printing stations, one of which 59″ is illustrated, may terminate different telephone extension lines as part of a company phone system or may comprise telephone line connections at different locations in the same or different cities. A preferred application of the system of FIG. 4 is for effecting automatic transmission of business forms, letters, pamphlets, graphs, and the like between different business or government organizations during the hours of low line load such as at night, thereby eliminating the need for transmitting such forms by mail or messenger service.

The apparatus of FIG. 4 includes a video scanner or camera 44 adapted for slow scanning one at a time of a plurality of pictures or image frames provided on an elongated conveyor belt, tape or film 36 shown for closed loop drive although it may comprise reel-to-reel driven tape. An intermittent card or page feed of said frames may also be employed in place of 36. The tape 36 is intermittently driven and stopped so that each frame thereof is centered in the scanning field of the camera 44. Control of said intermittent drive may be effected by switching control signals recorded on the side band area 42*c* of said tape as shown in FIG. 3, which may also effect and control the switching necessary to connect the output of said camera with a selected receiver-printing station in the system 52 in coaction with feedback signals derived from the selected station when connection is made therewith. Assuming that the tape 36 is in motion, a position indicating signal or pulse is recorded along the magnetic recording area 42*c* of the tape in a position such that it may be used to indicate that the next picture frame is about to become centered in the scanning field of 44 when reproduced from 36. Said pulse is reproduced by magnetic pick-up head 37*a* riding on said tape and is transmitted to energize the stop control S of motor 26 driving said tape whereupon the motor stops when the next frame to be transmitted is centered for scanning. During the same sweep of the tape, another pick-up head 37 riding on another channel of the magnetic portion of belt 36 reproduces a digital code therefrom to effect a line connection between the output 48 of 44 and the remote station 59″. The signals for single station connection, include a tone signal recorded on 42*c* and adapted to first be reproduced by pick-up 37 and to close a tone responsive relay 51–′ of one of the switches 51 thereby connecting 48 with the telephone switching system 52. The next recorded control signals are a series of pulse or tone signals next reproduced by 37 which simulate the pulses produced in manually dialing a number. Said signals are adapted to connect the output of 44 with one of the many circuits in the switching system 52. Since it is possible that the selected circuit connection may not be completed by the time the tape 36 has come to rest, means are provided to automatically recycle said tape if said connection has not been made. The ring signal generated on the input to the station 58″ causes a flip-flop input switch 60 to close by energizing the coil 62. The solenoid actuating 60 to close when a ring-responsive relay 62 is energized is also adapted to momentarily close a monostable, normally open switch 63 which gates a power supply to a tone generator 65 thereby generating a tone on the completed circuit which is transmitted back to the sending station and may be used for indicating said connection. The tone signal energizes a relay 65*a* at the transmitting station which actuates a second tone generator 65*b* which transmits a tone back to the receiving station 59″. The tone received at 59″ energizes the relay 66, responsive thereto, which actuates an automatic multi-circuit timer 70″ which effects the described actions which condition the storage tube 72 for writing and control the printing equipment for conveying an image exposing frame of film or paper to be centered in or driven past tube 72 or optical system 78. The timer 70″, when operating, energizes another tone generator 45′ which sends a tone signal back to the transmitting station and energizes a tone relay 45*a*. Said relay pulses or energizes the scanning controller of camera 44 which effects said video scanning action. The signal from 45*a* is also transmitted over another circuit and energizes a time delay relay 37*d* which is adapted to perform two functions. Relay 37*d* sends a signal to actuate the starter control F for the motor 26 a sufficient delay period after scanning starts to permit a complete scan of the image field of the camera 44. The first signal reproduced by 37 after tape 36 starts is a tone signal which is adapted to open all of the closed switches in the bank of output switches 51 which are sufficiently slow-to-open to permit said tone signal to also be passed to the circuit-opening tone responsive relays 64 at all printing stations connected to transmitting station 9″ thereby opening the flip-flop input switches 60 of each station. The described cycle repeats when the next code signals are reproduced by 37 to effect connections as described. If it is desired to retain the circuit with station 59″, said signal which activates switches 51 and 60 are not recorded on the next length of tape which contains only the tape drive stop-signal. If it is desired to transmit the next picture or image to other stations not connected during the prior cycle, the new picture signal and pulse train necessary for effecting said connection may be recorded on the next length of the area 42 scanned by pick-up head 37.

A means for automatically indicating when a connection has not been made and recycling the functions to effect a circuit selection is provided in FIG. 4. The tape position indicating stop-pulse reproduced by 37*a* is also transmitted to a time delay relay 37*b* on circuit 37*b*′ which actuates relay 37*b*. The time delay relay 37*b* is adapted to transmit a pulse over an output at a predetermined time after receipt of said stop-pulse provided that a second input thereto is not energized, which resets and deactivates said relay until circuit 37*b*′ is next energized. The rest input circuit 37*b*″ to 37*b* extends from a second time delay relay 37*d* which is energized by the tone signal generated by 45*a*. Thus, if there is no signal generated by 45*a* which indicates that controller 70′ at the receiving station 59″ is activated, 37*b* will provide an output signal which may be used to deactivate the apparatus, activate an alarm, or merely recycle the tape 36 so that the same signals may be generated and may be used in another attempt to establish connection with 59″. The output of 37*b* is shown connected to the energizing input of a multi-circuit timer 37*c* of the self resetting type which becomes deactivated after effecting a complete control cycle. The timer or controller 37*c* is adapted to control the motor 26 by energizing and de-energizing its reverse and forward controls R and F at time intervals to effect movement of tape 36 at least a distance equivalent to one frame and drive it forward again, thereby repeating the aforedescribed reproduction of connection signals to effect said circuit connections and preposition the same image frame in the scanning field of 44. One of the other circuits controlled by 37*c* includes a counter 37*e* which counts the times 37*c* becomes energized and is adapted to activate an alarm 37*f* after a predetermined number of recycling actions indicating that the connection has not been made after a predetermined number of attempts to make said connection. The output of 37*e* may also be connected to the forward drive control F of 26 which is operable thereby after a predetermined number of circuit connector attempts to step the conveyor to the next frame. Said output circuit 37*g* of 37*e* is also shown connected to a recording head 37*k* operatively coupled to a third channel of the magnetic track 42*c* of the tape for recording a signal on the proper length of the tape to indicate which picture signal was not transmitted due to failure to make the circuit connection. Later when the tape is rewound or examined, the signal recorded by 37*k* may be used to recycle the particular frame or to indicate to a person or computer checking said recording channel which connections have not been made and which picture information still requires transmission. The notation 37*h* refers to a time delay relay in the circuit 37*g* adapted to provide said recording on 36 while the tape is in motion at a time after 36 has been moved forward to energize the forward control F of 26.

The notation 64 refers to a tone responsive or coded relay adapted when energized to operate a solenoid or otherwise actuate switch 60 to open. If relays 64 of each station are responsive to different tones or codes, certain of said connections may be disconnected by signals reproduced from 36 while others are maintained for the continued transmission of information thereto.

Means are also provided in FIG. 4 for indicating at the transmitting station if all or parts of the picture signal was not received or recorded by one of the receiving stations even though the connection is made. The notation 45K refers to a limit switch or other means which becomes actuated when the tape or photosensitive paper 84 approaches or reaches the end of the web provided on the supply reel 86. Actuation of 86 may be used to sound an alarm or energize other indicating means at the receiving station. In FIG. 4, the actuation of 45K when it rides in a position indication slot in tape 84, energizes a tone generator 45K′ which transmits a pulse code to tone back to the sending station which energizes a tone or code responsive relay 45K′ which may shut down the apparatus thereat, actuate a buzzer or light, or energize a recording head 38*a* riding on the magnetic portion of 36 but on a different channel than the other heads. The position of the signal recorded by 38*a* is an indication of which picture signal was not recorded by all receiving stations. If 45K′ is adapted to emit when actuated a tone or pulse code followed by a second pulse code or tone indicative of the particular receiving station, and the relay 45K″ is a normally open switch which is closable by said first tone and is slow-to-open and adapted to pass said second pulse code or tone on the connected circuit to be recorded by means of head 38*a*, said recording will be indicative of which of the receiving stations did not provide a recording media and may be used for automatically indicating such a condition to the subscriber of the receiving station. The relay 45K may also be provided to become operative with the failure of other components in the receiving station apparatus such as the tube 72, motors, controls, etc.

The notation 72P refers to a photoelectric device such as a photomultiplier tube and relay positioned to scan a specific spot or area of the face of tube 72 and adapted to provide an output signal when said scanned spot is at a particular brightness or light emissivity. The output of 72P is connected through a normally open switch 72PSW to the energizing input of a tone or coded signal generator 45M which, when energized by 72P, transmits a tone or code back through the connected circuit to the transmitting station 9″ to which a tone or coded relay 45M″ is responsive. Said relay 45M″ is adapted to produce an output when energized by signal from 45M which is recorded on a separate channel of the magnetic area of recording member 36 through recording head 38*b*. The scanner or photoelectric cell 72P may be used to indicate if a condition such as a picture exists or doesn't exist on the writing face of video tube 72, and may be used to effect the immediate recycling of the transmission of the picture signal transmission or to effect a recording as described which may be later reproduced to effect said retransmission or indicate which picture signal was not received and written onto the face of 72. The image field scanned by the beam of 44 may contain a patch of a particular color brightness or black area in the same relative position as 72P so that if this color, brightness, or black area is not opposite 72P the latter may indicate the condition by means of an output signal after the deflection chain of 72 has been triggered. If 45M is a code producing switching circuit having a first part adapted to close a normally open switch and a second part adapted to pass through said switch and be recorded on the magnetic part of 36 the code may be such that it is indicative of which of the stations connected to the output of transmitting station 9″ did not have its picture tube 72 in operative condition or did not receive said picture signal. So as not to produce an output at all times, the normally open switch 72PSW is closed by means of the timer 70″ or by means of a code transmitted from 9″ and reproduced from the magnetic portion of 36. If 78 is a dual image optical system and 72P is a camera or cathode ray read tube with associated deflection circuits triggered by means of a signal from 70″ after the receipt of the picture signal and its conversion to an image on the face of 72, 72P may be used to generate a picture signal similar to the one modulating 72 which may be sent back to 9″ and recorded on 36.

The picture signal recorded on 36 may be kept as a record of the information transmitted and recorded at 59″ or may be automatically scanned and compared with the transmitted signal by also recording said transmitted signal on another channel of 36 as it is generated. If 72P is a camera scanning tube or flying spot scanner, it may also be positioned above the developed portion of the photosensitive strip 84 such as above or adjacent the cutoff page 84′ so that it will scan and provide a picture signal of what actually was printed or developed on the recording medium 84. In this arrangement, the scanning by said camera tube 72P is initiated by the multi-circuit timer 70″ at a time after the picture becomes developed and the disconnection of station 59″ from 9″ is not effected until the latter's receipt of the picture signal resulting from the scanning of the printed image. 72P may also comprise a plurality of small photomultiplier tubes placed at different positions relative to the writing face of 72 with each adapted to transmit a signal back to 9″ at different times during the scanning of the beam of 72 to indicate the continued receipt of the picture signal thereat.

FIG. 5 is a block diagram showing a facsimile system of the type described employing video magnetic recording and reproduction means at the transmitting station. The camera of FIGS. 1 to 4 is not provided in FIG. 5 to generate the slow scan picture signals which are transmitted over the automatic switching system lines to the selected receiving station or stations. In its place is provided a magnetic recording tape 506 having recorded thereon, in addition to the circuit selection and control signals as described, a plurality of video picture signals each derived from camera scanning a still picture and arranged in tandem array. Each picture signal is provided with a respective group of selection and control signals adapted to be reproduced from the tape just prior to the reproduction of the respective picture signal. The picture signals preferably contain the horizontal and vertical synchronization signals combined therewith so that the beam of the video receiver at the receiving station will be driven in synchronization with the picture generating portion of the transmitted signal. Since slow scanning is employed, it may only be necessary to record the frame vertical sync signal with or in advance of each picture signal either as a tone signal or conventional sync signal (to be clipped therefrom at the receiver), the rest of the scanning action occurring at each receiver and controlled by automatic synchronizing means thereat.

In FIG. 5, a tape transport 500 is provided comprising a supply reel 502 driven by motor 503 and take-up reel 504 driven by motor 505 for feeding a multi-channel tape 506 in motion relative to a plurality of magnetic heads. A plurality of idler pulleys 508 are provided for guiding the magnetic tape 506 which is driven by means of a constant speed motor 514 driving a capstan 510 against the tape. A depressor roller 512 serves to engage the tape frictionally against 510. The numeral 516 refers to a controller for controlling all three drive motors, which controller has three inputs F, S and R which when energized respectively control the tape drive servo to move the tape forward at constant speed, stop it, or reverse the drive thereof at a higher speed than said forward speed and preferably two or three times faster.

For many applications where picture information is to be transmitted to local receivers as compared to long distance circuit connection, the time to make the connection will usually be known, and, if the line is clear, will, for all practical purposes, take less than 10 seconds per connection. The tape 506 may therefore be driven continuously unless stopped as previously described to reverse and repeat the signal. Means are also provided in FIG. 5 for intermittently driving the tape, i.e.—momentarily stopping it until a selected circuit connection has been made. For continuous operation of the tape, all recorded picture and selection signals are spaced sufficiently far apart on the tape to permit enough time between the reproduction of a selection signal digital code to permit the prior connection to be made so that the following selection code signal will not disrupt or alter the selection switching action of the prior signal. A single reproduction head 520 is provided for reproducing all selection code signals and tone signals from a single track of 506 although, it is noted that multiple reproduction heads may be provided, each riding on a different track and each being connected to a respective input circuit to the automatic switching system 52 as shown in FIG. 6 thereby eliminating the need to pause between selection signal recordings to permit all selected circuits to which a particular picture signal is to be transmitted to be completed simultaneously. After the final selection code has been reproduced from 506 by 520 and sufficient time has elapsed for the circuit connection to be made, the slow scan picture signal associated therewith is reproduced by the magnetic reproduction head 518. The resulting transduced signal is amplified in a reproduction amplifier 519 and is transmitted over all completed circuits to the receiving and recording transducers of the selected stations 550 on lines 552. Another means for indicating if a selected connection has not been made is illustrated in FIG. 5 involving automatic control of the recycling of the tape whereby all selection tone and digital signals will be reproduced again.

Recorded on the channel of 506 from which head 520 reproduces is a tone signal which follows the digital selection signal which tone signal is of a different frequency than the tone preceding said code which energized a particular output switch 51– to close. This second tone signal is recorded in a position such that it will be reproduced some time after a tone signal of longer duration is produced at the selected receiving station if the connection selected by the associated pulse train has been made. Said receiving station tone may be generated by a relay 541 when the connection is made.

The relay 541 is a normally open switch which is slow-to-open after closing and is provided with a switching arm of the over-ride type which is actuated by the solenoid of the ring responsive relay 537 associated with the input 499L– to the selected station 499–. Upon closing, gate 541 gates a tone signal from a tone signal generator 541' or energizes said generator, the output of which is transmitted through the completed circuit back to the sending station.

A relay 528 responsive to said receiving station connection-indicating tone gates a signal when so energized which is operative to open a normally closed switch 526 having an input from a tone operative relay 524 which is responsive to a tone reproduced from tape 506 a short period after the tone is transmitted from 541' but which does not last longer than the tone of 541'. Thus if 528 is not energized (indicative that the circuit has not been completed) the second tone in the group reproduced from 506 will cause a signal to pass through 526. The resulting signal is passed to a control 530 for reversing and recycling the tape to again reproduce the digital selection code just reproduced. The controller 530 may be a multi-circuit recycle timer having control circuits to all tape transport forward, stop and reverse motor controls to effect the desired motion to the tape.

The output of 528 is also passed to a time delay relay 532 which gates a power supply to the switching input of 526 at some time after it, 532, becomes energized to prevent the recycling action resulting from the energizing of 530 from occurring after a predetermined time or number of recycling actions. Said output signal from 532 is also used to energize a recording head 522 positioned on a third channel of the tape 506 to record said signal alongside of or in a predetermined position relative the selection code signal for which the circuit connection was not made. So that the recycle timer 532 will not gate a signal to head 522 and the switching input to 526 if a connection has been made at some time after said connection is made, timer 532 may contain a reset switch actuated by a signal from 528 which is indicative that the connection with the particular receiving station has been made. The reset input of 532 is thus connected to the output of 528 and 532 remains inoperative until its activating-input from 526 is again energized. It is noted that 532 may also be a counter adapted to transmit a signal to the switching input of 526 for a sufficient time period after a predetermined number of counts of the output of 526 to maintain 526 open, so that when tone relay 524 is next energized by the frame indicating signal reproduced by 520, 530 will not become energized and the tape will continue its motion forward and will be provided with a signal recorded thereon indicating which station connection was not made. Said counter may be reset to zero by a signal transmitted from 528.

The switches 51 which connect the output circuit 523 of the picture signal reproduction head 518 and the code signal transducer 520 with selected circuits in the telephone switching system 52 operate in a manner as described for the apparatus of FIGS. 1 to 4, in which the code or tone signals opening and closing the individual switches 51–a, 51–b, 51–c, etc. with system 52 are reproduced from tape 506 by head 520 in the proper order as described. Said order includes a first tone signal operative to close a specific switch 51–, a digital selection signal operative to select and complete a circuit in the system 52 and a tone signal operative to energize relay 524. After the completion of all connections, the picture signal is reproduced followed by a tone signal to open all circuits.

The receiving station 499 illustrated in FIG. 5 is provided with a recording medium which is a magnetic tape 536 drivable past magnetic reproduction heads 544 to 549 by means of a tape transport 542 which is not shown in its entirety. The movement of the multi-channel tape 536 during the recording of a frame picture signal is controlled by a multi-circuit recycle timer 530′ which like 530, controls the starting and stopping of the motors driving the reels and capstan of transport 542 whereby the tape 536 travels a predetermined degree while the picture signal is being transmitted over the completed circuit from pick-up 518 and is being recorded on 536. Sequential controller 530′ is initially energized by means of a tone operative or coded relay 554 which gates a power supply or transmits an energizing pulse to 530′ when energized by a tone or code signal which has been reproduced by the transmitter apparatus 500. The signal energizing 554 is derived from a recorded tone or pulse code provided on tape 506 at a position such that it will be reproduced and transmitted over all completed circuits a predetermined time in advance of the reproduction of the associated picture signal therefrom such that the tapes 536 of all receiving units will attain a constant speed for picture signal recording by the time the picture signal is transmitted thereto. So as not to record noise or the control tone signals on the picture signal recording channel of 536, the input to the recording amplifier 545 of picture signal recording head 544 is normally disconnected from the common input line 558 of the receiver unit and is connected and disconnected by means of a bistable switch 556 which is controlled to close and open respectively during the transmission of the picture signal by means of tone signals provided at each end of the picture signal on 506. The first of said tone signals may be the signal energizing 554 and may be derived from the vertical frame sync signal of the video picture signal.

A recording head 546 is operative to record signals on another track of 536 where signals indicate the position of each picture signal thereon, and when later reproduced, may be used as a frame sync signals adapted to trigger the deflection chains of a video writing tube 570 for visual monitoring the signal or to effect the printing of a document or the analysis of the signal transmitted. A picture signal reproduction pick-up 548 is provided to reproduce from 536, the output of the amplifier 552 of which is connected to the write beam of video writing or storage tube 570. Since it may be required to reproduce only certain of the signals recorded on 536 as prints or permanent picture information, a means is provided in FIG. 5 for visually monitoring the picture by eye and, if it is decided to affect hard copy recording, manual control of printing means may be employed. A bi-stable switch 560 is employed in the circuit of a pickup 548 which, when closed, permits the transmission of the reproduced picture signal from pick-up head 548 to the video signal input of tube 570. The switch 560 is slow-to-open and is actuated to close by the frame sync signal reproduced from 536 by a pick-up head 549 riding on the same track as recording head 546. A manually operated switch 560′ is provided between video pick-up head 548 and the video signal input to the storage tube 570 so that if an operator is not present to view the image recorded on the viewing screen of 570 the picture signal will merely be recorded on magnetic tape 536 for later monitoring. The switch 560′ is also operable by one of two controllers 530a and 530″. Whereas the multi-circuit recycle timer or sequential controller 530′ functioned to control movement of the tape 536 only in the act of recording a picture signal transmitted thereto from sending station 498, no provision was made to control the storage tube 570 and to effect the printing of a hard copy or picture image derived from said picture signal in many applications it may be only necessary to magnetically record the picture signal on 536, monitor later and print only if selected by the personnel at the receiving station 499–. A second sequential controller or multi-circuit recycle timer 530a is provided which may be actuated locally by closing a switch 568 or from the picture signal transmitting station by means of a tone operative or coded relay 555 responsive to a signal or signals transmitted thereto. Said signal may be provided as a recording at the correct position on tape 506 to be reproduced by head 520. When 530a becomes energized, it controls movement of the tape 536 whereby the next picture signal recorded thereon is reproduced by video reproduction head 548 which signal is amplified in amplifier 552 and passed to the picture signal input of storage tube 570 for modulating the beam thereof to provide an image on the tube or screen face. Controller 530a also closes switch 560′ and 560 is closed for a predetermined time by the frame pulse reproduced by reproduction head 549 just prior to the reproduction of the picture signal therefrom. Another circuit of 530a effects erasure of the screen of tube 570 in advance of the new signal to remove the prior signal trace or noise. Still another output of 530a is connectable through a switch 562 to the energizing input of another sequential controller 530″ which may also be a multi-circuit recycle timer of the self-resetting type utilized to effect the automatic printing of a picture or image on the screen of 570. The optical system 572 of the storage tube 570 contains a viewing screen 573 for viewing the image and a screen 573′ adjacent a length of photosensitive paper 84 and separable therefrom by a shutter (not shown) but which is controlled to open and close after the image has appeared by means of a motor or solenoid operated by 530″. 530″ like controller 70 of FIG. 1 controls such other actions as shearing or cutting of the paper 84 to proper length, the drive of servo means in the developing apparatus 92, drive of a conveyor for removing the print from 92 and/or of a stacking or collating machine. If it is desired to first monitor the image visually before determing to make a print thereof, the switch 562 may be manually opened. By closing a second switch 562′ in circuit with the energizing input to 530″ and a power source the operator may make one or more prints of the image he sees on the monitor screen 573 of the viewing apparatus. Although none of the motors for driving tape 536 are shown in FIG. 5, it is assumed that they are all controlled by 530′ and 530 and automatic speed control means in the manner in which the drive of 500 is effected. The switch 556 is provided in the circuit of the input to the recording amplifier of the picture signal recording head 554 and may be similar to the switches 51–. Switch 556 may be opened and closed by means of respective tone relays responsive to tone signals reproduced from tape 506 at the proper instants. Manual control for rapid forward or reverse travel of tape 536 may also be provided for monitoring any desired length of the tape. A counter or other device operating off the tape 536 may be used to indicate to the person monitoring the signals thereon which frame he is reproducing from. The tone operative relay 539 of switch 540 operates a solenoid opening the contacts 538 thereof upon receipt of a tone signal reproduced from 506 by head 520 at the end of the reproduction of the picture signal or signals desired to be transmitted to the receiving stations.

If a conventional telephone system is employed for effecting connections between the sending station and selected receiving stations provided in the systems of FIGS.

1 to 5, a conventional dial code generated on the line will cause a ring signal to close a switch such as 540 by energizing a ring responsive relay 537. While this will merely close switch 538 without actuating any of the tape transport apparatus or motors, it is desirable to open the contacts of 538 again and break the circuits between the input of the receiving apparatus and the telephone circuit input to the switch 564 is provided which is also responsive to the ring signal generated on line 499L by the switching system. Switch 564 has a resetting input from the controller or multi-circuit timer 530′ so that if it (564) is not reset shortly thereafter, its output is connected to the actuating input of the solenoid controlled by tone relay 539 so that the bi-stable contacts 538 of 540 are closed by the closure of the contacts in 564 which gates a power supply thereto. The provision of 564 permits the line 499L– to also be used as an input to a conventional telephone receiver 565. So as to prevent conversation from being recorded on 536, the tone transmitted to energize 555 may be audible or may be used to energize a tone relay which opens a switch 565′ between phone 565 and the line 499L–, said switch being closable by the same tone energizing 539 by means of another tone relay responsive thereto. It is noted that the relays 555 and 539 may be used to respectively open and close the switch 565′ by energizing respective solenoids which open and close bi-stable contacts of 565′ in the manner that contacts are closed and opened.

Modifications to the apparatus illustrated in FIGS. 1 to 5 are noted as follows:

FIG. 3 illustrates a record medium at the scanning station employing a plurality of images **42*a* which are shown as film or picture frames developed or printed in the film strip or paper 42. It is noted that member 42 may also be a conveyor belt carrying the individual pictures, photographs or sheets thereon in spaced apart relation. The sheets or papers 42*a* may be merely placed on 42 by manual or automatic means. If manually placed, marks on the belt 42 may be used for precise spacing. The belt 42 may also contain fastening means for positioning and securing the individual sheets 42*a* or pictures. Clips may be used, fastened to the belt at precise spaced apart positions for securing the pictures or sheets 42*a* in the correct spacing. The magnetic strip 42*c* need not be integral with 42 but may be a separate tape synchronized in motion to the movement of 42** by gearing or other means, coupled to the transport for said tape.

The pictures or frames **42*a* may also be provided on punchcards automatically fed into, positioned and removed from the scanning field of camera 44 by known feeding means synchronized in operation by the multi-circuit recycle timer or controller 12 of FIG. 2 for example. The code and selection signals may be recorded photographically on each frame and reproduced for said selection and control functions by a photomultiplier tube or tubes reading a border area of each photograph or page to be scanned. The punch cards, if employed may contain digital information in the form of holes therein which when read as said card is positioned or fed to a scanning means produces said digital code signals which are transmitted over the output 48 to all the circuits connected to the switching system 52 through the output switches 51** for effecting said automatic receiving station connections.

FIG. 6 is a schematic diagram showing the signal transmitting means of FIG. 5 modified for the simultaneous transmission of a plurality of digital selection signals as pulse trains to the switching system 52 so that the time required for total signal transmission is substantially reduced. Instead of utilizing a single recording track for controlling and effecting circuit selections as in FIGS. 1 to 5, the tape 506 shown in lateral cross-section in FIG. 6, is provided with a plurality of recording tracks C–. On the first track or channel C1 is recorded the picture signals in tandem and in positions to be reproduced by the pick-up head 518 after all digital switching and control signals for making circuit connections have been reproduced and said connections have been made. The heads 520– each ride on a respective track and simultaneously reproduce the described tone and/or digital selection signals necessary to respectively close their respective output switches 51– to the switching system inputs and select the predetermined receiving station to be connected to the picture signal output 523. Thus all selected circuits are simultaneously made and there is no need for one connection to await the connection of another selected circuit. The tone signal energizing the relays 554 or 555 of all receiving stations is recorded on track C1 in advance of the recording of the picture signal.

In the event that all commanded connections are not made it may be desired to recycle the tape and repeat the operation or indicate which of said selected connections has not been made. This may be effected in one of several manners. If the described tone generator 541′ of each station is preset to generate said tone for transmission back to the sending station at a time other than that at which a similar tone is generated from all the others all said tones may be recorded on different lengths of a single channel CN of tape 506. The position where a tone is not present is indicative of which of the selected circuits were not connected. A normally open switch 575, closeable for a predetermined period during which all tone signals are received by station 498′, may be used to connect the input 574 of the recording head 520N recording the chain of tone pulses on channel CN. The switch 575 may be closed for the predetermined time by a signal reproduced from an adjacent channel CN′ by a respective reproduction head 520N′ for the time necessary for all receiving station tones to be received and transmitted through 575 for recording on CN. Automatic indicating means employing a counter may be used to indicate which circuit connection was not made. If the system contains a large number of rereceivers, the relays 541′ may be each a code emitter, each of which is adapted to transmit a different code at a different time so that the code which is not recorded on CN is indicative of which connection has not been made. By using code matching means the missing codes may be rapidly determined. For the system employing the recording of different time generated tones, the length characteristic or position of the tone may be used to indicate which circuits were completed and which picture signals recorded.

FIG. 6′ shows a circuit operative for determining which of the selected circuit connections, if any, were not made due to failure to make a circuit connection through the automatic switching system. A reproduction head 520N′ rides on a channel CN of the tape 506′ on which has been recorded the tone signals through recording head 520N of FIG. 6. Recorded on an adjacent channel CK are a plurality of signals adapted to be reproduced simultaneously with the reproduction of the signals recorded on CN. One of said signals recorded on CK is of a duration such that a respective connection indicating signal recorded on CN, if present, will be reproducible during the reproduction of said respective signal. The outputs of 520N′ and 520K are connected to a logical "AND" switching circuit 520NA which produces an output if its two inputs are simultaneously energized. An output from 520NA opens normally closed switch 520NC which prevents the signal reproduced from channel CN′ from passing to the energizing or actuating input of an analog to digital converter 576. If both signals are not present at 576 an output is produced from 520NC and the digital converter is pulsed causing it to emit a binary code which is indicative of which of the selected circuits were not completed. The code may be transmitted to conventional binary controlled switching means to gate the selection signal through the transmitting station output 523 for the retransmission of the picture signal. The digital converter 576 is activated by means of a relay 577 responsive to the tone signal reproduced from 506 by 518 which was used to energize 45' or 541. Since circuit connection time will not be a constant, the relay 577 is preferably energized by the signal transmitted back to the sending station and generated by the first of the relays 541' to become energized. Notation 576' refers to a shift register adapted to provide a pulse train output from 576.

The notation 576' refers to a shift register connected to the output of the binary converter 576 which provides the parallel code thereof to an in-line code or pulse train which may be recorded on tape 506' by passing it to a recording head 520K. If the relays 45' or 541 of each receiving station in the system are of a different time constant such that each is adapted to become energized and emit a signal at a different time than the others, then an output from 576 will be indicative of which of the receiving stations did not transmit a connection indicating signal on the connected line back to the transmitting station 998'. The notation 501*a* refers to a oneway gate such as a diode in the output circuit of head 519. It is also noted that the tone relays such as 451 or 541 may be replaced by code emitting circuits each adapted to emit a specific code at a different time which may be recorded onto specific lengths of track CN by the means of FIG. 6. Absence of a selected code thereon is an indication of which circuit was not completed. However, as this would require a code matching system involving the recording of all codes from connected stations and the automatic determination thereafter of which of the codes is not present, a more direct approach may be attained as follows. Reference is made to FIGS. 6 and 4 or 5. In FIG. 4 the relay 45' of the receiving circuit emitted a tone indicative of the completion of said circuit which was transmitted back to the sending station. In FIG. 5, this was accomplished when relay 541 was energized as the circuit was completed. If the notations 541 or 63, or 45' refer to switching circuits which emit specific codes when energized by the respective means provided, and each receiving station is provided with such relay or code emitter adapted to emit a code different from the others during a time interval which is different from the time interval during which all the others emit codes, then the codes from all receiving stations may be matched with codes of the same characteristic during the operation or later, if recorded on said tape. If 575 is a normally closed, slow-to-close after opening electronic gate in the output of 520N' and passed through 575 will be indicative of the circuit which was not completed of those selected due to the fact that 575 was not opened by the code or signal from the respective connected receiving station at the time the similar code was reproduced from 506'. The reason 575 is provided slow-to-close is that once it is opened, it will remain open long enough to prevent the passage of any part of the code reproduced from CN' to the recording head 520N and differences between the synchronization of the motion of the tape 506', the recordings thereon and the actions of the code emitting circuits of the receiving stations will be accounted for.

In FIGS. 5, 6 and 6' notations 501– refer to electronic valves such as diodes which permit signals to be transmitted only in the direction of the apex of the triangle of the symbol. For example, diodes 501*a* and 501*a'* are utilized in FIGS. 5 and 6 so that only the signals produced by head 518 will pass over the output of the amplifier thereof in the direction of the output of said sending station and signals received on the common line 523 will not pass to the output of the amplifier. The notation 580 of FIG. 6 refers to a transformer having a single input from 519 and outputs to transmit the picture signal reproduced by 518 to all circuits which are connected with switching system 52.

A number of variations are noted in the apparatus of FIGS. 5 and 6. For example, the elongated magnetic tapes of either or both the transmitting and receiving recording means may be replaced by magnetic strips, cards or discs of the type shown in Patents 2,650,830 and 2,658,762 with both selection and picture signals provided on the recording means of the sending station at intervals such that continuous movement of the recording medium relative to the reproduction transducer may be effected. Intermittent operation of the tape transport or record disc may be employed by providing a signal on a separate track of record member 506, reproducing said signal after the selection and connection signals have been reproduced and using it to energize the stop control S of tape drive servo 516. The start control F of 516 may be actuated by the signal output of the tone relay 528. This is shown in FIG. 5 in which the numeral 522' referring to the reproduction head for picking up the recorded servo stop signal for stopping the tape transport drive of 506 at the end of the reproduction of a digital selection code group and the output of coded or tone relay 528 may be used to actuate the forward drive or start control F of 516 when the prior selected circuit has been completed.

If photographic or magnetic record bearing punch cards are employed at either or both the transmitting and receiving stations of the circuitry of FIG. 5, the feed of either or both will be controlled and interlocked to the operation of the apparatus at the other station by means of tone or coded relays operative in one or more of the manners hereinabove described. The holes in the punch cards, if said cards are provided at the sending station may be read to provide said digital selection codes. One or more holes may be provided adjacent thereto for connecting tone generators with the common output line or the cards may contain pulse code holes for generating coded pulse trains adapted to energize coded relays to perform the functions of 541, 554, 555, 556, 565', 564, etc. Such cards if applied to the sending station may be driven intermittently in a manner such as to effect the reproduction of a specific circuit selection code or pulse train by a controlling servo motor or solenoid to effect a brief movement of the card by the signal output of coded or tone responsive relay 528. The final movement of the card before its ejection from the reading mechanism will be that to effect the positioning of the picture or film image portion thereof in the scanning field of the video camera.

Manual or automatic selection means for the generation of selected of the multiple pictures or record signals provided on the recording medium 506, 42 or the mentioned disc or cards, for transmission as picture signals to selected receiving stations, may also be provided.

Numerous other modifications of the present invention will be appreciated by those skilled in the art and accordingly the appended claims should be construed as broadly as is consistent with the appended claims and, in certain instances, some features of the invention will be used without a corresponding use of other features.

What is claimed is:

1. Automatic facsimile apparatus comprising in combination with a sending station, an automatic telephone switching and connection system for effecting the transmission of picture signals from a sending station to selected of a plurality of receiving stations connectable to said sending station through said switching system, a picture signal generating means including means for generating a plurality of television picture signals capable of being transmitted over a wire pair of said switching system on an output of said sending station which is connectable to said automatic switching system through an output switch, a switching signal generating means operatively connected to the output of said sending station, said switching signal generating means having recorded therein a plurality of selection signals each of which is adapted when reproduced for effecting a respective line connection between said sending station and a selected receiving station, means for closing said output switch and generating thereafter a plurality of signals for effecting a connection of said output and a first of said receiving stations, a relay means at said sending station, means for automatically energizing said relay means when a circuit connection is completed, means controlled by said relay means for operating said picture signal generating means to generate a first picture signal on the completed line, apparatus at said receiving station for recording said signal, means at said sending station for actuating said output switch to open at the termination of transmission of a complete picture signal, means operative by a signal generated at said sending station for disconnecting the line from said automatic switching system to said first receiving station at the termination of receipt thereby of a complete picture signal, means thereafter for automatically energizing said switching signal generating means after disconnecting the output of said sending station with said receiving station for generating a new selection code, and means thereafter for generating further picture signals each after a connection is effected with a predetermined receiving station by the generation of a respective selection code.

2. Apparatus in accordance with claim 1, said picture signal generating means comprising a conveyor for a plurality of image frames, said conveyor having a plurality of switching signals recorded thereon which include selection codes recorded in predetermined positions relative to said image frames, a video scanning means positioned off said conveyor for scanning said image frames, a scanning means for said switching signals including a transducer connected to said output of said sending station and positioned to reproduce and generate said selection codes on the line extending to said switching system, a servo means having stop and start controls for driving said conveyor, a first relay for operating said start control, a second relay for operating said stop control, said receiving stations each having a signal generating means which is operative upon the completion of a circuit with said sending station for generating a signal of predetermined characteristic on the completed circuit which is transmitted to said sending station and to which said first relay is responsive which energizes the start control for said servo means whereby the next image frame on the conveyor is moved into the scannnig field of said video scanning means, means upon the appearance of an image frame in said scanning field for energizing said video scanner whereby a video picture signal derived from scanning said image frame is produced and transmitted over the connected circuit, said switching signals including an end-of-transmission signal positioned for reproduction by said transducer and transmitted after scanning the last image frame to said receiving station, and a disconnect relay at said receiving station responsive to said end-of-transmission signal to effect the disconnection of said circuit.

3. Apparatus in accordance with claim 1, said picture signal generating means comprising a video scanner including means for effecting a raster scan of an image field, a plurality of image frames provided on an elongated flexible member, a transport for said flexible member, means for automatically conveying said image frames intermittently into the scanning field of said video scanner, said switching signal generating means including a plurality of signals in the form of groups of signals recorded on said flexible member and adapted for reproduction therefrom by a transducer with the movement of said member, each signal group including a pulse train in the form of a selection code for reproduction and transmission over said output of said sending station to said switching and connection system for effecting a line connection with one of said receiving stations, a second signal reproducible from said flexible member after said first signal, a relay at said connected station which is responsive only to said second signal, an input recording switch operative by said relay to close and complete a connection between said sending station and the input to a recorder, and to condition said recorder to receive and record signals generated thereafter on the completed circuit, a tone generator operated by said relay for generating a tone on the completed circuit which tone is transmitted back to the sending station, a tone responsive relay at said sending station responsive to the tone of said tone generator, and a controller operative in response to the energization of said tone responsive relay to control the video scanning of the image in the scanning field of the video scanner whereby a picture signal is transmitted through the connection of the switching system and is recorded on the recording medium of said recorder.

4. Apparatus in accordance with claim 3, certain of said signal groups each containing an end-of-recording signal which is reproducible and transmitted over the connected circuit at the termination of transmission of a picture signal, a second relay at each receiving station, a switch operated by said second relay for disconnecting the completed circuit, said second relay being responsive to said end-of-recording signal.

5. Apparatus in accordance with claim 1, said picture signal generating means comprising in combination with a scanning transducer, a conveying means for moving a plurality of image frames past said transducer in a consecutive order whereby said frames are scanned to produce respective picture signal generating means, a recording medium for said selection codes, said selection codes recorded in predetermined positions thereon, a transducing means for reproducing said selection codes as they move therepast, the selection code recording medium being synchronized in its movement to the movement of said image frames in a manner whereby each code is reproduced and used to effect a predetermined connection prior to the generation of a predetermined picture signal.

6. Apparatus in accordance with claim 5, including an electrical device at said sending station which is energized when a connection with a receiving station is not completed, an erasable recording means, said electrical device being operatively connected to said erasable recording means for indicating by providing a recording thereon an indication of that circuit which was not completed, said electrical device also adapted when so energized to effect movement of said selection code recording means in a manner whereby the next selection code is reproduced therefrom.

7. Apparatus in accordance with claim 6, including means for automatically recycling said selection code recording means and reproducing selection codes associated with those circuit connections which were not completed during the prior scanning of said tape.

8. Automatic facsimile apparatus comprising in combination with a pulse code operated telephone switching and connection system including means for generating ring signals on the inputs to terminal circuits of said telephone system, means for effecting the automatic and rapid transmission of picture signals from a sending station to selected of a plurality of receiving stations connectable to said sending station through said telephone switching system, a picture signal generating means operatively connectable to said automatic telephone switching system on an output circuit through an output switch of said sending station, said picture signal generating means having a conveying means for a plurality of frames of picture information, a transducer for automatically scanning said frames, and generating picture signals, a servo means operatively connected to move said conveying means relative to said transducer, a switching signal generating means having recorded therein a plurality of circuit selection codes, means for sequentially operating said switching signal generating means to generate selection codes in a consecutive order, the output of said picture signal generating means being connected to said output circuit through said output switch, each of said selection codes when generated on said output circuit adapted for operating said automatic switching system to effect a connection with an input line to a terminal circuit of a predetermined receiving station whereby a ring signal is generated on said line, a further switching means on said input line including a relay responsive to said ring signal for connecting the terminal circuit of said receiving station with the output of said sending station, a sequential control means including a first relay at said sending station adapted to become energized upon the completion of a circuit, and to start said servo means to move said conveying means relative to said transducer and effect scanning and the generation of a picture signal on the connected lines, the recording means at each receiving station adapted to become operative after the completion of a circuit for receiving and recording picture signals transmitted thereto, automatic means for de-energizing said first relay at the end of scanning of an information frame, automatic means for operating said further switching means to open and disconnect said terminal circuit from said automatic switching system at the end of a recording cycle, and means thereafter for operating said switching signal generating means to generate the next selection code to automatically effect a connection between said sending station and another receiving station whereby the facsimile cycle is repeated.

9. Apparatus in accordance with claim 8, said conveying means for said plurality of frames of picture information comprising an elongated tape containing frames of the different images to be transmitted to said receiving stations, said tape also having a further recording channel adjacent the image frame portion thereof, a transducer for scanning said image frames, a transducer for scanning said further channel, said transducers being connectable to said output circuit through said output switch and means for controlling said servo means in moving said tape whereby a selection code is reproduced prior to the passage of a respective frame into the scanning field of its transducer and the tape is stopped until after a connection is made with a receiving station.

10. Apparatus in accordance with claim 9, said means for controlling said servo means comprising a relay energizable only by a predetermined signal and connected to a controller for stopping movement of said tape when energized, the input to said relay being connected to the output of said transducer scanning said further channel, and a signal recorded on said further channel for reproduction therefrom at the end of the generation of a selection code and for energizing said controller relay to effect the stopping of said tape in a position whereby scanning of said image frame may be immediately initiated upon the completion of said receiving station circuit.

11. Automatic information transmitting and recording apparatus comprising in combination with a sending station and a plurality of receiving stations which are automatically connectable to said sending station through an automatic telephone type switching and connection system, a recording member at said sending station having a plurality of information signals recorded on a first track thereof and a plurality of switching and connection signals recorded adjacent said first track, a transducing means for said information signals, said switching signals including a plurality of selection codes in predetermined positions on said recording member for reproduction therefrom prior to the reproduction of a respective information signal, said transducer for said selection codes having an output connected to said automatic switching system, a servo motor means for driving said elongated recording member, a scanner transducer positioned to reproduce said information signals therefrom, a plurality of circuit connection switches at each of said recording stations including a first switch responsive to a signal developed on the input line by said automatic switching system, a second input switch connected in series with said first switch and a recorder and responsive to a tone signal developed on the input line which passes through said first switch thereto, there being tone signals recorded on said recording member in predetermined positions thereon each for reproduction therefrom after a respective selection code has been reproduced whereby it may be transmitted to complete a connection with a receiving station.

12. Automatic facsimile apparatus employing a conventional automatic telephone switching and connection system for effecting the automatic transmission of picture signals from a sending station to selected of a plurality of receiving stations which are connected to terminal circuits of said switching system, comprising in combination with a picture signal generating means at said sending station having a plurality of outputs of said generating means each simultaneously connectable to a different receiving station for the simultaneous transmission of a picture signal to each of the connected receiving stations, each of said outputs being terminal circuits of said automatic telephone switching systems which are connectable to said automatic switching system through a respective output switch, means for closing a first of said output switches and for generating a first selection code on its line for transmission to the automatic switching system for operating said switching system automatically thereafter to effect a connection with a first receiving station, a relay means at said sending station adapted to become energized upon the completion of a circuit with said first receiving station, said relay means being operative to effect the closure of a second of said output switches and the generation of a second selection code on the branch circuit thereof for effecting a connection to a second receiving station, means operative after the completion of a plurality of the branch-receiving station circuits with said sending station for controlling said picture signal generating means to transmit a predetermined picture signal simultaneously over all completed circuits, and a recording means at each of said receiving stations adapted for recording all picture signals transmitted thereto from said sending station.

13. An automatic communication system for the transmission of information between a sending station and a receiving station over voice wire pair telephone lines comprising in combination with a telephone switching and connection system to which said sending and receiving stations are operatively connectable, a signal generating apparatus at said sending station having its output connected to the terminal circuit thereof, a signal recording apparatus at said receiving station having a recording transducing means operatively connected to the terminal circuit thereof, means for transducing from said signal generating apparatus a plurality of signals, said signals including a plurality of information signals and a plurality of switching signals, means for generating certain of said switching signals and a connection code and transducing said signals on the output of said sending station for effecting a connection between the terminal circuit thereof and the terminal circuit of said receiving station, said switching signals also including a first tone signal generated after said connection code and after a connection has been made with said receiving station on the completed circuit, a tone operative relay having a switching input connected to the terminal circuit of the receiving station and responsive to said first tone signal, control means for conditioning said signal recording apparatus for recording operatively connected to and energizable by said tone operative relay, means at said receiving station for generating a feed-back tone signal on the completed circuit, immediately upon completion of said circuit, a relay at said sending station responsive to said feedback tone signal and operative, when energized, to control said signal generating apparatus to generate information signals, which are recorded at said receiving station, and means at said sending station for automatically generating a break-circuit signal after a predetermined number of information signals have been generated, and a relay responsive to said disconnect signal for disconnecting the output of said sending station from said telephone switching and connection system.

14. An automatic communication system in accordance with claim 13 including a relay operated switch between the input to said receiving station and the terminal circuit therefor for connecting and disconnecting said recording apparatus with said input circuit and for disconnecting said terminal circuit from said switching system, said switch being responsive to the ring signal developed by the phone switching system on the input line to said receiving station to effect a connection therewith, means at said sending station for automatically generating a further tone signal to which said relay switch is responsive after said predetermined number of information signals have been generated and transmitted to said receiving station for disconnecting said circuit, said system also including an automatic means for reconnecting the output of said sending station with said telephone switching and connection system after its terminal circuit has been disconnected therefrom and for automatically generating thereafter new switching and connection signals in a new cycle of operation.

15. An automatic communication system in accordance with claim 13 including a further relay at said sending station, means for energizing said further relay when a circuit has not been completed with a receiving station after the generation of a switching and connection code, said relay adapted to effect the recycling of said signal generating means for again generating the same switching and connection code on the line to the switching and connection system.

References Cited in the file of this patent

UNITED STATES PATENTS

| | | |
|---|---|---|
| 2,133,811 | Finch | Oct. 18, 1938 |
| 2,474,257 | Kleinschmidt | June 28, 1949 |
| 2,647,945 | Ridings et al. | Aug. 4, 1953 |
| 2,673,891 | Jones | Mar. 30, 1954 |
| 2,747,015 | Ridings | May 22, 1956 |
| 2,767,242 | Ridings et al. | Oct. 16, 1956 |
| 2,779,816 | Kolpek | Jan. 29, 1957 |
| 2,903,517 | Ridings | Sept. 8, 1959 |
| 2,949,502 | Logan | Aug. 16, 1960 |